(12) United States Patent
Grunditz

(10) Patent No.: US 6,290,182 B1
(45) Date of Patent: Sep. 18, 2001

(54) JOINT FOR SPACE VEHICLE

(75) Inventor: Hans Grunditz, Linköping (SE)

(73) Assignee: Saab Ericsson Space AB, Göteborg (SE)

( * ) Notice: Subject to any disclaimer, the term of this patent is extended or adjusted under 35 U.S.C. 154(b) by 0 days.

(21) Appl. No.: 09/496,429

(22) Filed: Feb. 2, 2000

(30) Foreign Application Priority Data

Feb. 3, 1999 (SE) .................................. 9900354-3

(51) Int. Cl.[7] ........................................ B64G 1/62
(52) U.S. Cl. .................... 244/161; 244/131; 403/333; 403/338
(58) Field of Search .................... 244/161, 131, 244/158 R; 403/333, 334, 335, 338

(56) References Cited

U.S. PATENT DOCUMENTS

| 4,976,399 | * | 12/1990 | Bay et al. ............................. 244/161 |
| 5,466,025 | * | 11/1995 | Mee ...................................... 244/161 |
| 5,520,476 | * | 5/1996 | Marks et al. ......................... 244/161 |
| 5,649,680 | | 7/1997 | Andersson ............................ 244/161 |
| 6,076,467 | * | 6/2000 | Cespedosa et al. .................. 244/161 |
| 6,126,115 | * | 10/2000 | Carrier et al. ........................ 244/161 |

FOREIGN PATENT DOCUMENTS

| 0905 022 A1 | 3/1999 | (EP) | ................................ B64G/1/64 |
| wo 87/97235 | 12/1987 | (WO) | ............................... B64G/1/64 |

* cited by examiner

*Primary Examiner*—J. Woodrow Eldred
(74) *Attorney, Agent, or Firm*—Swidler Berlin Shereff Friedman, LLP

(57) ABSTRACT

A joint in a space vehicle to hold together a first part of the vehicle and a second part of the vehicle that can be separated from the first part, in which the joint includes a first flange member (1) attached to the first part of the vehicle and a second flange member (2) attached to the second part of the vehicle. A number of clamps (4) equipped with two clamping lips (5, 6) are distributed around the perimeter of the flange members (1, 2) that transfer radial force from a tensioning means (7), arranged around the clamps (4), to both of the flange members (1, 2) in order to press these together, whereby rolling members (8) are arranged between at least one of the clamping lips (5, 6) of the respective clamps (4) and the adjacent first (1) or second (2) flange member.

15 Claims, 3 Drawing Sheets

JOINT FOR SPACE VEHICLE

TECHNICAL AREA

The current invention relates to a joint to hold together separable parts of a space vehicle preferably during launch of the space vehicle. In particular, the invention is directed towards a joint that includes a number of clamps that are pressed by means of a surrounding strap against flanges that surround the respective perimeters of an adapter ring on each of the separable parts, in which the task of the joint is to hold the said adapter rings together and to be able to absorb the forces that act to separate the separable parts and to absorb torsional and flexural forces that act between the separable parts during the period that the joint is in use.

THE PRIOR ART

Joint devices to hold together separable parts of a space vehicle, such as a launch vehicle and a satellite, constitute important structural units to absorb the forces that act between the said parts during launch of the vehicle. Such joint devices must be of low weight and must be designed with very high reliability, due to the very high costs of launching and at the same time due to the fact that it is impossible to correct any faults that may arise once the vehicle has left the ground.

Joints have been developed and refined in this technical area during the last few decades, in order to minimise the risks that any part of the joint fails during that part of the rocket trajectory for which the joint is to function.

The separable parts of a space vehicle will be exemplified in the current document by a launch vehicle with a satellite mounted onto the launch vehicle by a joint. An example of a joint of this type is given in American patent document U.S. Pat. No. 5,649,680. The said document shows an adapter at the upper part of a launch vehicle, arranged to receive a ring that is mounted on a satellite and designed to fit onto the adapter. The adapter is equipped at its upper end with an adapter flange around its perimeter. The base of the satellite is equipped in an equivalent manner, as has been mentioned, with a ring, which is also equipped with a flange, here termed the satellite flange, around its perimeter. The satellite and the adapter of the launch vehicle make contact with each other in a plane of contact, whereby the adapter flange and the satellite flange also make contact with each other in a plane of contact. A number of clamps are arranged in evenly distributed sectors around the plane of contact so that they can be brought into contact with their openings over both of the said flanges and press these flanges together when a tensioning strap outside of and around all of the clamps tensions the clamps against the flanges when the tensioning strap is tightened. A joint of this type in denoted in the following as a "clamp connection".

The flanges on the surface that faces away from the plane of contact, that is the surface that is clamped by the clamps, in clamp connections of the type that has been described, are designed with an angle of release, also here called a clamping angle, that is larger than of the order of magnitude of 9°–11°. The clamping lips of the clamps, that is the shanks of the clamps, are also designed with a corresponding angle of release on the inner surfaces of these clamping lips, that is, on the surface of the clamps that makes contact with a flange. A minimum angle of release of this order of magnitude is necessary in joints of this type so that the clamps can slide off the flanges when the clamp is released so that the satellite and launch vehicle can thereby separate from each other safely. If the angle of release is smaller that the said order of magnitude, a risk for self-locking arises, that is, the flanges of the satellite and the launch vehicle are unable to separate due to locking of the clamps against the flanges caused by friction against the clamping lips of the clamps. For example, if the angles of release of the flanges and clamps are zero, no separating forces arise when the joint is released.

Satellites today bear higher and higher loads, and this means that the forces that act on a clamp connection are increasing. These forces include forces that act in the axial direction of the launch vehicle and thus act to separate the satellite and the launch vehicle, whereby increasing forces arise at the joint. The dividing forces are transferred to the tensioning strap because the angle of release is high. Thus it is desirable to reduce this angle as much as possible, preferably right down to zero. However, difficulties arise in this way in that self-locking may arise, which means that it is not possible with currently available technology to reduce the angle of release significantly. Another method for solving the problems associated with absorbing higher loads is to increase the tension in the tensioning strap. This alternative, naturally, eventually reaches an upper limit.

DESCRIPTION OF THE INVENTION

From the point of view of the invention, a joint is arranged in a space vehicle to hold together a first part of the space vehicle and a second part of the space vehicle that can be separated from the first part, where the joint includes a first flange member attached to the first part of the space vehicle, a second flange member attached to the second part of the space vehicle, and a number of clamps distributed around the perimeter of the flange members equipped with two clamping lips that transfer radial forces from a tension means arranged around the clamps to both of the flange members in order to press these together and where in addition rolling members are arranged between at least one of the clamping lips of the respective clamps and the attached first or second flange members.

Joints according to the description above occur when the first part of the vehicle normally consists of a launch vehicle while the second part of the vehicle normally consists of a satellite, but it is fully possible that the first part of a vehicle is a satellite while the second part of a vehicle is a probe or other examples of combinations of parts of vehicles.

The task of the joint is to absorb forces that act to separate the vehicle parts during launch of the space vehicle and during manoeuvring in a trajectory. When the second part of the vehicle is to separate from the first, the joint is released by release of the tensioning means, whereby the arrangement is such that the clamps roll off from the flanges without any significant friction between the flanges and the clamping lips of the clamps. A significant advantage is achieved by this arrangement in that it is hereby possible to design the flanges with an angle of release right down to zero degrees, which means that significantly higher clamping forces, that is, forces that press the flanges against each other, can be transferred from the tensioning means to the flanges without risking the occurrence of self-locking during the release of the joint.

The clamps are arranged and distributed around the perimeter of the flanges that are pressed together, and are each equipped with two clamping lips that grip the two flanges when the tensioning means presses the clamps against the flanges. The clamps have an extension along the perimeter of the flanges and in this way each takes up a sector of the said perimeter. The tensioning means normally consists of a tensioning strap that surrounds and encloses the clamps. The clamps are thus pressed radially inwards towards the flanges by tensioning of the tension strap. When the joint is to be released, the action of force on the tensioning strap is released, by which the clamps slide off from the flanges and the vehicle parts can separate from each other.

The rolling members according to the invention can consist of rollers or balls. These rolling members are thus arranged either between the respective outer surfaces of the flanges and the adjacent clamping lips of the clamps or only between the outer surfaces of one of the flanges and its adjacent clamping lips of the clamps, that is, in the latter case, only on the satellite flange or the adapter flange, for example.

When the rolling members consist of rollers, these have the form of cylinders, whereby the concept of cylinder should here be understood in its broadest meaning, that is, a body whose cross-section is limited by a closed curve. The cylinder may be circular, but the cross-sectional area of the cylinder is preferably a symmetrical ellipse with a greater dimension along a major axis and somewhat shorter dimension along a minor axis. By means of such an elliptical form of the rolling members, it is possible to achieve a strongly increasing clamping power as a result of the tightening force in the tensioning strap, as the angle between the major axis of a roller and the axial direction of the vehicle approaches zero. In normal cases, the joint is intended to be used with clamping angles that approach zero degrees, but in special cases the clamping angle can be allowed to pass zero degrees, whereby self-locking (flipping over) occurs when the joint is under pressure, without there arising from this fact any difficulties in achieving separation of the parts of the vehicle or of achieving a high contact pressure between the parts of the vehicle while the joint can still be released with very low friction between the flanges and the members of the joint.

If the rollers are circular cylinders, the same effect as has just been described can be achieved by a design of the surface of the flanges that face outwards towards the clamping lips so that the rollers are forced to roll following a profile on the flange surface. The desired effect can be achieved by suitable design of the profile (the profile need not be the same on the flange as it is on the clamping lip). In this embodiment, the outer part of the clamping lips can be designed with a claw that prevents the roller being pressed out of the space between the flange and the clamping lip.

An alternative design is to arrange a circular cylinder at one of the flanges and an elliptical cylinder at the other flange in order to achieve gradually increasing clamping force.

The rolling members may alternatively consist of balls. In this embodiment, the design of the joint should be otherwise equivalent to the arrangement in which circular cylinders are used as rolling members.

A significant advantage of the arrangement described from the point of view of the invention is that is becomes possible to achieve a considerable increase of clamping force in the joint at a given tension in the strap relative to that possible using currently available technology.

EMBODIMENTS

A number of embodiments of the invention are now described, supported by and with reference to the figures.

Figure 1:
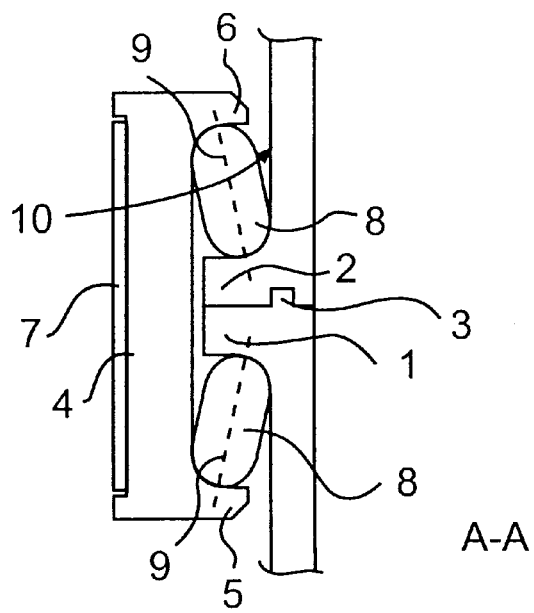
FIG. 1 shows schematically in side view a partial cross-section of the joint according to the invention, in which two elliptical rollers are arranged between the clamping lips of a clamp in order to press together flanges that belong to two different parts of a vehicle.
Figure 3:
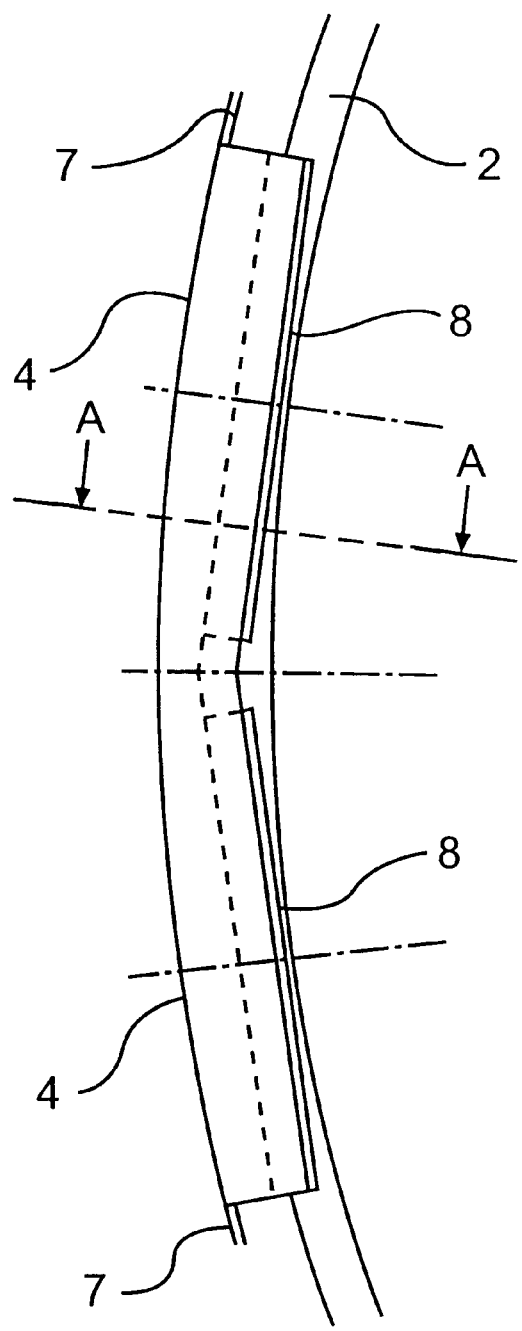
FIG. 3 shows in plan view a partial cross-section through the rolling members of the joint.

A cross-section of a clamp connection according to the invention is shown in FIG. 1. The parts of the vehicle are here represented by a launch vehicle and a satellite, where an adapter at the top of the launch vehicle has a flange indicated by 1. The satellite is in an equivalent way equipped with a flange 2 at the bottom. The task of the joint is to hold satellite flange 2 and adapter flange 1 together against a plane of division during manoeuvres in a rocket trajectory. In order to control the relationship of the flanges to each other and to absorb shear loading of the joints, the flanges are equipped with a guide 3. Shear loads can also be absorbed by the use of so-called shear pegs, as is currently done in the most common joints. The flanges 1, 2 are according to this example circular, as is shown in FIG. 3, which shows part of the circular flange 2. The flanges 1, 2 encircle and lie external to the satellite and adapter, respectively.

Along the perimeter of the flanges 1, 2 a number of clamps 4 are arranged. The clamps 4 are placed around the joint and each one occupies a certain sector angle of the perimeter of the circle that the joint forms. The clamps 4 are further equipped with clamping lips 5, 6 that are intended to grip around the flanges 1, 2 when the clamps are passed over the flanges. A tensioning strap 7 is arranged around the complete joint and enclosing all clamps. The clamps are pressed radially inwards against the flanges 1, 2 by applying a force to the tensioning strap 7. According to previously known technology, the radially acting force from the clamps is transferred to a compression force on the flanges in that both clamping lips and the outer surfaces of the flanges have release angles that slope outwards. In the current invention, the transfer of force from clamps to flanges is achieved by arranging rollers 8 between the clamping lips 5, 6 and the flanges 1, 2. In the example according to FIG. 1, the rollers consist of cylinders whose cross-sections are elliptical and symmetrical along a major axis 9. In the case that is most preferred, the said elliptical cross-sections are limited by a closed curve that is formed by a rectangle in which two opposite sides are replaced by two semi-circular arcs. When the tensioning strap 7 is pulled together, the clamping lips 5, 6 roll along the roller 8 so that the clamp is driven radially inwards, while the major axis 9 of the roller 8 approaches more and more closely an axial position. "Axial" here is used to mean axial relative to the vehicle, that is, perpendicular to the plane of division of the joint. The clamping lips 5, 6 will thus submit the flanges to an ever-increasing axial force of compression. This compression force reaches a maximum when the roller 8 according to the example is positioned with the major axis 9 along the axial direction (vertical in FIG. 1). The aforementioned flipping over or self-locking occurs in this position, when the major axis 9 of an elliptical roller 8 occupies an axial position, that is, there is no longer any force that acts outwards radially on the clamps 4.

Figure 2:
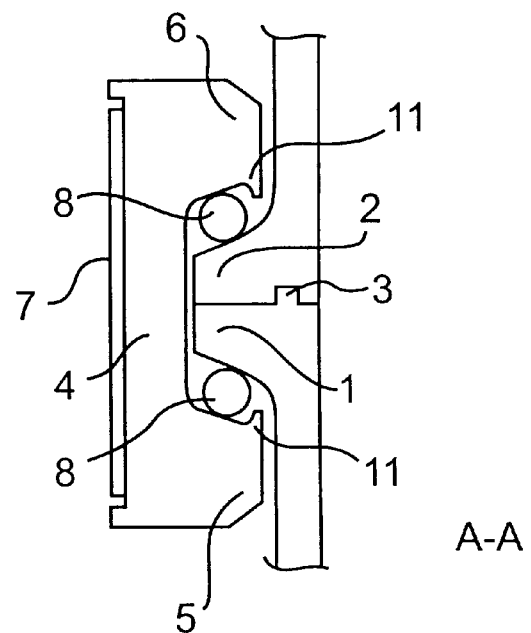
FIG. 2 reveals schematically in a side view a partial cross-section of a joint in which circular rollers or spherical balls are used as roller devices between clamping lips and flanges, whereby a claw is arranged on the outermost part of the clamping lips in order to contain the rolling members.
Figure 4:
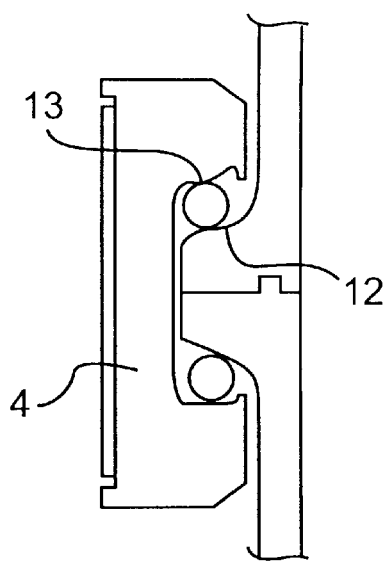
FIG. 4 shows a profiled roller pathway with a roller profile on one of the outer surfaces of the flanges and an equivalent roller profile on the inner surface of a clamping lip.

An alternative embodiment is shown in FIG. 2, in which the flanges 1, 2 have been designed with an angle of release greater than zero, whereby the clamping lips 5, 6 of the clamps 4 have also been designed with an equivalent angle. In this example, rollers 8 with a circular cross-section have been arranged between the flanges 1, 2 and the clamping lips. Balls can also be used as rolling members in this alternative. By this arrangement, the clamping lips can roll up on the flanges 1, 2 with low friction during compression of the joint by means of the tensioning strap 7. Here, clamping lips with angles less than the said approximate 9° can be used, and even values right down to zero, without any risk of the joint being locked (by shearing, or similar). The clamping lips 5, 6 are equipped at their outer part with claws 11 curved inwards against the adjacent flange 1, 2 in order to contain the circular rollers or balls, if such are used. It is possible also in this case with rolling members of a circular cross-section to achieve a gradually increasing clamping force, which is done by designing the surface of the flange or the surface of the clamping lips which lie against the rolling members in a suitable manner. An example of such a surface is shown in FIG. 4, in which the flange surface has a curved design (12, 1), with a gradually decreasing clamp angle.

The extent of the clamps 4 along the perimeter is shown in FIG. 3. As is shown in FIG. 3, the inner wall of the clamps against the roller 8 can lie in a straight line. The clamp 4 will in this way make contact with its inner wall along the roller 8, while the roller 8 only has one contact point against the wall 10 of the flange. Balls can naturally be used as rollers, whereby several contact points against the flange wall 10 occur. Alternatively, the adapter flange 1 and the satellite flange 2 can be designed to be straight along the stretch where the respective flange lies against a roller 8, which gives a better distribution of force between the roller 8 and flanges 1, 2.

The joint according to the invention can be varied in a number of different ways. One variation that can be named is that it is fully possible to use rolling members 8 in the form of rollers or balls only on the flanges on one side of the plane of division, that is, only between one clamping lip and the flange, for example the satellite flange 2, that is adjacent to the said clamping lip.

Figure 5:
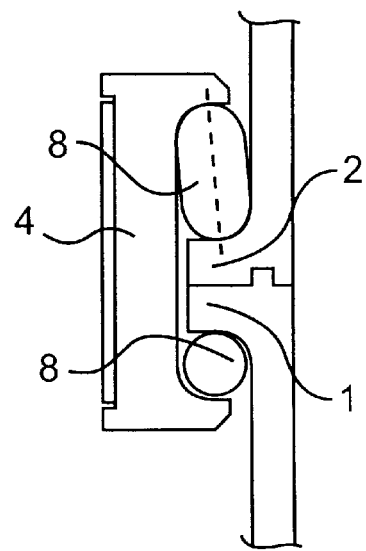
FIG. 5 shows a joint in which different types of rolling member are arranged on each side of the plane of division of the joint.

According to another alternative, it is fully possible to use different types of roller 8 on each side of the plane of division of the joint, for example, circularly cylindrical rollers can be used on one side of the plane of division, while cylinders of elliptical cross-section can be used on the other side of the plane of division. Such an arrangement is shown in FIG. 5.

What is claimed is:

1. Joint in a space vehicle to hold together a first part of the vehicle and a second part of the vehicle that can be separated from the first part, in which the joint includes a first flange member (1) attached to the first part of the vehicle, a second flange member (2) attached to the second part of the vehicle and distributed around the perimeter of the flange members (1,2) a number of clamps (4) equipped with two clamping lips (5,6) that transfer radial force from a tensioning means (7) arranged around the clamps (4) to both of the flange members (1,2) in order to press these together, characterised in that rolling members (8) are arranged between at least one of the clamping lips (5,6) of the respective clamps (4) and the neighbouring first (1) or second (2) flange member.

2. Joint according to claim 1, characterised in that the rolling members (8) consist of bodies of cylindrical shape.

3. Joint according to claim 2, characterised in that the cylindrically shaped rolling members (8) have a cross-section that is elliptical and symmetrical along a major axis (9).

4. Joint according to claim 1, characterised in that the cylindrically shaped rolling members (8) have a cross-section whose limiting curve consists of a rectangle in which two opposite edges have been replaced by arc-formed curves.

5. Joint according to claim 3 characterised in that self-locking of the joint is achieved by forcing the major axis (9) of the roller devices to flip over a direction that is perpendicular to the plane of division of the joint.

6. Joint according to claim 4 characterised in that self-locking of the joint is achieved by forcing the major axis (9) of the roller devices to flip over a direction that is perpendicular to the plane of division of the joint.

7. Joint according to claim 2, characterised in that the cylindrically shaped rolling members (8) have a circular cross-section.

8. Joint according to claim 1, characterised in that the rolling members (8) consist of spherical balls or in that the rolling members consist of spherical balls at one flange (1,2) and cylindrically shaped bodies at the other flange (1,2).

9. Joint according to claim 7, characterised in that the clamping lips possess claws (11) at their edges in order to contain the rolling members (8) between flanges (1,2) and clamping lips (5,6).

10. Joint according to claim 8, characterised in that the clamping lips possess claws (11) at their edges in order to contain the rolling members (8) between flanges (1,2) and clamping lips (5,6).

11. Joint according to claim 7 characterised in that a strongly increasing clamping force in the joint is achieved by the flange surface (1,2) having a curved surface (12,13) against the rolling member (8) and/or the clamping lip (5,6).

12. Joint according to claim 8 characterised in that a strongly increasing clamping force in the joint is achieved by the flange surface (1,2) having a curved surface (12,13) against the rolling member (8) and/or the clamping lip (5,6).

13. Joint according to claim 9 characterised in that a strongly increasing clamping force in the joint is achieved by the flange surface (1,2) having a curved surface (12,13) against the rolling member (8) and/or the clamping lip (5,6).

14. Joint according to claim 10 characterised in that a strongly increasing clamping force in the joint is achieved by the flange surface (1,2) having a curved surface (12,13) against the rolling member (8) and/or the clamping lip (5,6).

15. Joint according to claim 1, characterised in that the first part of the vehicle consists of a launch vehicle and that the second part of the vehicle consists of a satellite.

* * * * *